United States Patent
Krimmer et al.

(10) Patent No.: US 6,604,516 B1
(45) Date of Patent: Aug. 12, 2003

(54) FLAP VALVE

(75) Inventors: Erwin Krimmer, Pluederhausen (DE); Ralph Krause, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 09/787,715

(22) PCT Filed: Jun. 10, 2000

(86) PCT No.: PCT/DE00/01917

§ 371 (c)(1), (2), (4) Date: May 11, 2001

(87) PCT Pub. No.: WO01/07808

PCT Pub. Date: Feb. 1, 2001

(30) Foreign Application Priority Data

Jul. 21, 1999 (DE) .......................... 199 34 113

(51) Int. Cl.⁷ ................................. F02B 47/08
(52) U.S. Cl. .................. 123/568.18; 251/305; 251/306; 251/308
(58) Field of Search ....................... 123/568.18, 568.21; 251/305–308

(56) References Cited

U.S. PATENT DOCUMENTS 6,135,415 A  * 10/2000 Kloda et al. .......... 123/568.18

* cited by examiner

*Primary Examiner*—Ehud Gartenberg
*Assistant Examiner*—Melvin A Cartagena
(74) *Attorney, Agent, or Firm*—Ronald E. Greigg

(57) ABSTRACT

In a flap valve for controlling a gas stream, having a valve tube that carries the gas stream and having a valve flap, disposed in the valve tube, that is pivotable between a closing position and an open position and is seated in a manner fixed against relative rotation on an adjustable flap shaft, to avoid openings of the shaft in the valve tube inside the sealing region between the valve flap and the valve tube, the flap shaft is oriented such that its axis forms an acute angle ($\alpha$) with the axis of the valve tube. The valve flap seated on the flap shaft in a manner fixed against relative rotation is oriented such that in its closing position, its surface normal is aligned with the axis of the valve tube or extends at an acute angle to it.

18 Claims, 5 Drawing Sheets

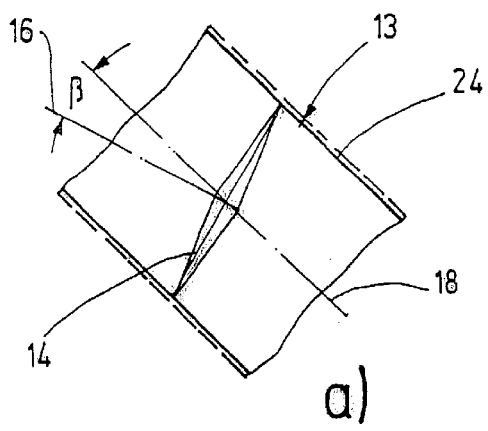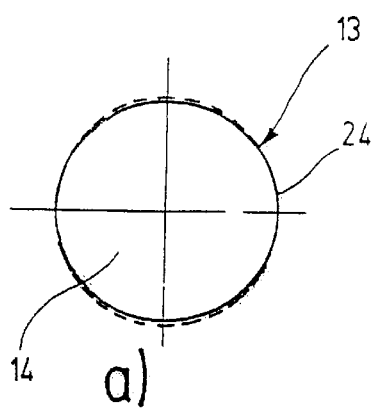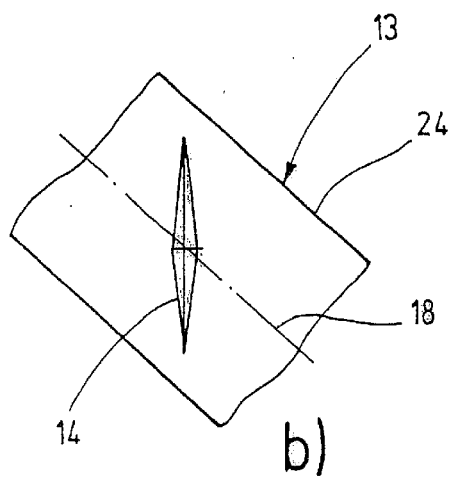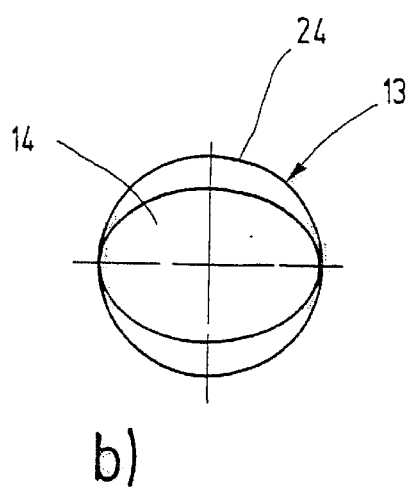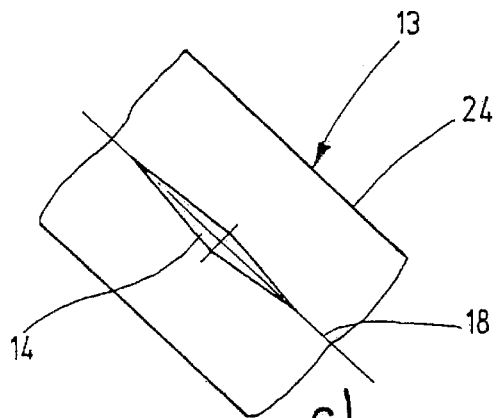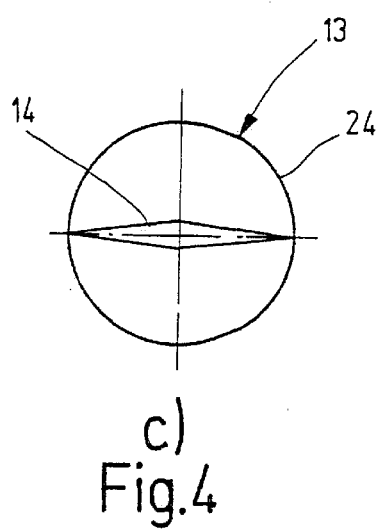
Fig. 3
Fig. 4

FLAP VALVE

CROSS-REFERENCE TO RELATED APPLCATIONS

This application is a 35 USC 371 application of PCT/DE 00/01917 filed on Jun. 10, 2000.

FIELD OF INVENTION

The invention relates to a flap valve for controlling a gas stream, in particular an exhaust gas stream of an internal combustion engine.

DESCRIPTION OF PRIOR ART

In a known arrangement of a throttle valve in an exhaust gas conduit of an internal combustion engine. German Patent Disclosure DE 43 05 123 A1, the flap shaft, which carries the throttle valve and extends parallel to the plane of the flap, is guided on both sides by a bearing bore in the conduit wall of the exhaust gas conduit, and on each side protrudes through a bearing sleeve there. To achieve greater tightness while avoiding sluggishness of flap actuation, the bearing sleeves, is each axially prestressed by spring force in a respective bearing housing, are radially displaceable inside the bearing housing, and as a result dimensional deviations between stop faces for the throttle valve that are embodied on the conduit wall and the flap shaft bearing, the first time the throttle valve closes, are automatically compensated for.

SUMMARY OF THE INVENTION

The flap valve of the present invention has the advantage that as a result of the angular positioning of the flap shaft relative to the axis of the valve tube, the requisite shaft openings in the valve tube are removed from the region of the sealing face between the valve tube and the valve flap, and thus the sealing problems that occur in the known flap valves are circumvented. When the valve flap pivots, each point located on the edge of the valve flap moves along an imaginary spherical surface; therefore—unlike the situation with the known flap valves—"drilling" of singular points, with the attendant wear of the valve flap and tubular wall of the valve tube, causing leakage in the closing position of the valve flap, is prevented.

As a result of the structural design of the invention, the rotational angle of the flap shaft that is required to shift the valve flap out of its closing position to its open position and vice versa is increased. At the same time, the torque to be exerted on the flap shaft for flap adjustment is reduced. The overall result is the creation of a geometric gear whose gear ratio i is dependent on the angular positioning a of the axis of the flap shaft relative to the axis of the valve tube. If the acute angle $\alpha=45°$ is selected, then compared with the known flap valve, the rotational angle $\omega$ of the flap shaft for moving the valve flap between the closing position and the open position doubles to $\omega=180°$. At the same time, the torque to be exerted for the rotary motion is reduced to half that required for the known flap valves.

In an advantageous embodiment of the invention, the angle $\alpha$ between the flap shaft and the axis of the valve tube is chosen to be in an angular range equal to or greater than 10° and less than 90° and is preferably selected to be 45°. At angular values $\alpha$ that are less than 45°, it must be noted that then the valve flap can no longer be opened completely. However, since the characteristic curve of the gas throughput as a function of the free cross-sectional area of the valve tube has a generally strongly degressive course in flap valves, this angular range can also be utilized to achieve long rotary paths and low torques at the flap shaft.

In an advantageous embodiment of the invention, the valve tube is inserted in gastight fashion into an opening provided in the jacket of a further tube and is oriented such that the flap shaft extends perpendicularly to the axis of the further tube. Because of this structural design, exhaust gas can be supplied in metered fashion, for instance to the fresh air aspirated in the aspiration system of the internal combustion engine, if the flap valve is used as an exhaust gas recirculation valve in the intake tract of the engine; the further tube forms the air intake tube extended to the engine, and the valve tube is connected to an exhaust gas recirculation line of the engine. The disposition of the valve tube and flap shaft results in a space-saving, compact version. Alternatively, if the installation space is large enough, the valve tube can be oriented perpendicularly and the flap shaft obliquely to the axis of the air intake tube.

In a preferred embodiment of the invention, the valve tube is embodied as an elastically deformable thin-walled tube, and the valve flap is adapted in form and surface area to the inside cross section of the thin-walled tube. Because of the elastically flexible tubular wall of the thin-walled tube, a sealing element between the valve flap and the valve tube can be dispensed with, since the tubular wall, because of its elasticity, is capable of conforming tightly with the edge of the valve flap, in the closing position of the valve flap. To assure the tightness of the flap valve, of which stringent demands are made particularly when it is used as an exhaust gas recirculation valve, the form and surface area of the valve flap must be adapted exactly to the inside contour of the thin-walled tube, or must be made somewhat larger. A circular form of the inside cross section of the thin-walled tube and correspondingly a circular form of the valve flap are preferred. Alternatively, an elliptical or oval form can be considered. In the circular version, the diameter of the valve flap is dimensioned as equal to or greater than the inside diameter of the thin-walled tube. In the first case (diameter of the valve flap equal to the inside diameter of the valve tube), the valve flap is positioned relative to the flap shaft such that in the closing position of the valve flap, its surface normal is aligned with the axis of the thin-walled tube, and in the second case (diameter of the valve flap greater than the inside diameter of the valve tube), it is oriented such that in the closing position of the valve flap, its surface normal is at an acute angle to the axis of the thin-walled tube. In the latter case, in the closing position the thin-walled tube is deformed, which virtually produces an ellipse whose long radius is equivalent to the radius of the valve flap, and whose circumference is equivalent to the circumference of the tubular inside wall of the thin-walled tube.

Since upon opening of the flap valve, the thin-walled tube first deforms back again, the result for the same rotational angle of the flap shaft is initially smaller opening cross sections. By this means, better small-quantity meterability is achieved, that is, a spread of the characteristic curve of the gas throughput over the rotational angle, in the range of small rotational angles.

In an advantageous embodiment of the invention, the thin-walled tube is inserted with radial play into a rigid tubular stub and is fastened by one end to the tubular stub. As a result, the thin-walled tube is deformable freely (except in the axial direction) and can conform quite well to the valve flap and can thus achieve good sealing action. To reinforce this property, the wall thickness of the thin-walled tube must not be too great, and the diameter of the thin-walled tube must not be too small. With a view to adequate strength along with a still-tolerable vibration behavior of the thin-walled tube, a thin-walled tube diameter of 10 to 200 mm and a wall thickness of 0.05 to 2 mm have proved to be advantageous. As a result of the oblique course of the flap shaft, discontinuities in the thin-walled tube that interfere with the uniform deformability of the thin- walled tube, of the kind that can occur for instance from wall apertures for passage of the flap shaft, are also avoided.

BRIEF DESCRIPTION OF THE DRAWINGS

The invention is explained in further detail in the ensuing description in terms of exemplary embodiments shown in the drawing. Shown are:

FIG. 3, is a detail of a longitudinal section of the flap valve of FIG. 2, with a valve tube and a modified valve flap, in three different pivoted positions of the valve flap;

FIG. 4, is a view of the flap valve of FIG. 3 in the direction of the valve tube axis, for the three different pivoted positions of the valve flap;

DESCRIPTION OF THE PREFERRED EMBODIMENTS

Figure 1:
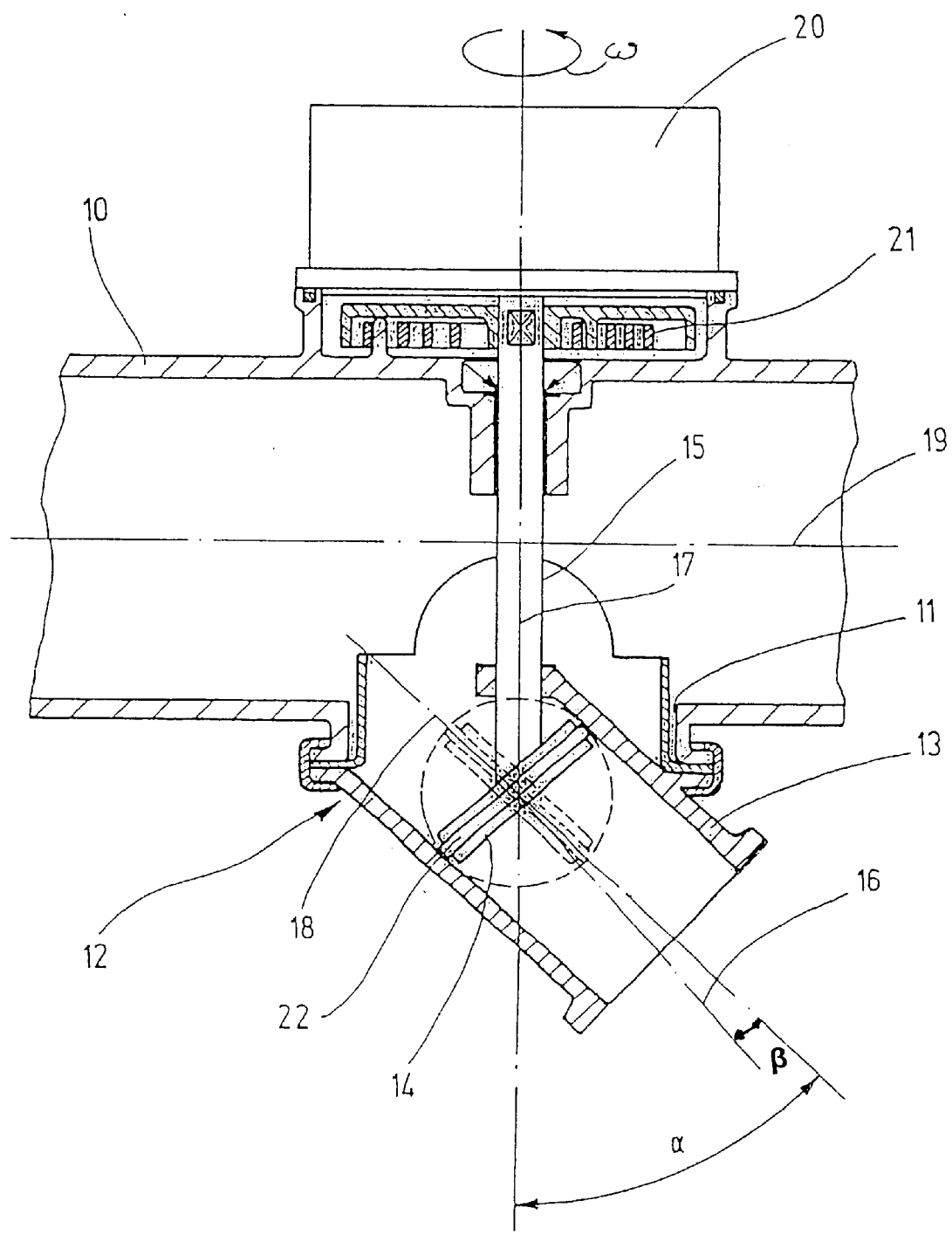
FIG. 1, is a longitudinal section through a flap valve, used as an exhaust gas recirculation valve in the intake tract of an internal combustion engine.

The flap valve shown schematically in longitudinal section in FIG. 1 serves as an exhaust gas recirculation valve in the intake tract of an internal combustion engine. It has an intake tube 10 for air, leading to the engine, and a throttle valve, not shown here, is typically disposed in it to control the air stream. An opening 11 into which the flap valve 12 is inserted in gastight fashion is provided in the jacket of the intake tube 10. The flap valve 12 has a valve tube 13, which is embodied as a tubular stub to be connected to an exhaust gas conduit, not shown here, of the engine, and as well as a valve flap 14, disposed in the valve tube 13, which is seated on a motor-drivable flap shaft 15 and is pivotable between two terminal positions; in the one terminal position (the closing position), it completely covers the inside cross section of the valve tube 13, and in the other terminal position (the open position), it maximally uncovers it. The flap shaft 15 is disposed such that its axis 17 forms an acute angle α with the axis 18 of the valve tube 13. This acute angle α, in the exemplary embodiment of FIG. 1, is selected as α=45°, but it can also be in an angular range of equal to or greater than 10° and less than 90°. The valve flap 14 is oriented relative to the flap shaft 15 in such a way that the surface normal 16 of the valve flap 14, when the valve flap 14 is in the closing position, is at least approximately aligned with the axis 18 of the valve tube 13. In the exemplary embodiment of FIG. 1, the flap shaft 15 is disposed perpendicularly to the axis 19 of the intake tube 10 and is rotatably supported in the tubular wall of the intake tube 10. With one shaft end, it protrudes through the jacket opening 11 of the intake tube 10 into the valve tube 13 of the flap valve 12, and on this shaft end, it carries the valve flap 14. The other shaft end, remote from the valve flap 14, protrudes at a right angle past the tubular wall of the intake tube 10. This end of the shaft is engaged both by a control motor 20 for rotating the flap shaft 15 and by a restoring spring 21 embodied as a spiral spring, which returns the flap shaft 15 to a defined basic position; the basic position is defined by a stop, not shown here, on which the flap shaft 15 and/or the valve flap 14 rests. The basic position of the flap shaft 15 is set such that in the basic position, the valve flap 14 assumes its closing position shown in FIG. 1. The valve tube 13 has a circular inside cross section, and the diameter of the also circular valve flap 14 is dimensioned as equal to or slightly smaller than the inside diameter of the valve tube 13. To achieve good sealing action, a sealing element 22 which protrudes from the valve flap 14 around its circumference is operative, in the closing position of the valve flap 14, between it and the inner wall of the valve tube 13.

In FIG. 1, the flap valve 12 is shown in its closing position. By rotation of the flap shaft 15 about a rotational angle ω=180°, the valve flap 14 is transferred to its open position, which is represented by dot-dashed lines in FIG. 1. Upon this rotary motion of the flap shaft 15, the valve flap 14 executes a kind of tumbling motion, in which every point on the edge or circumference of the valve flap 14 moves along the imaginary surface of a sphere.

Figure 2:
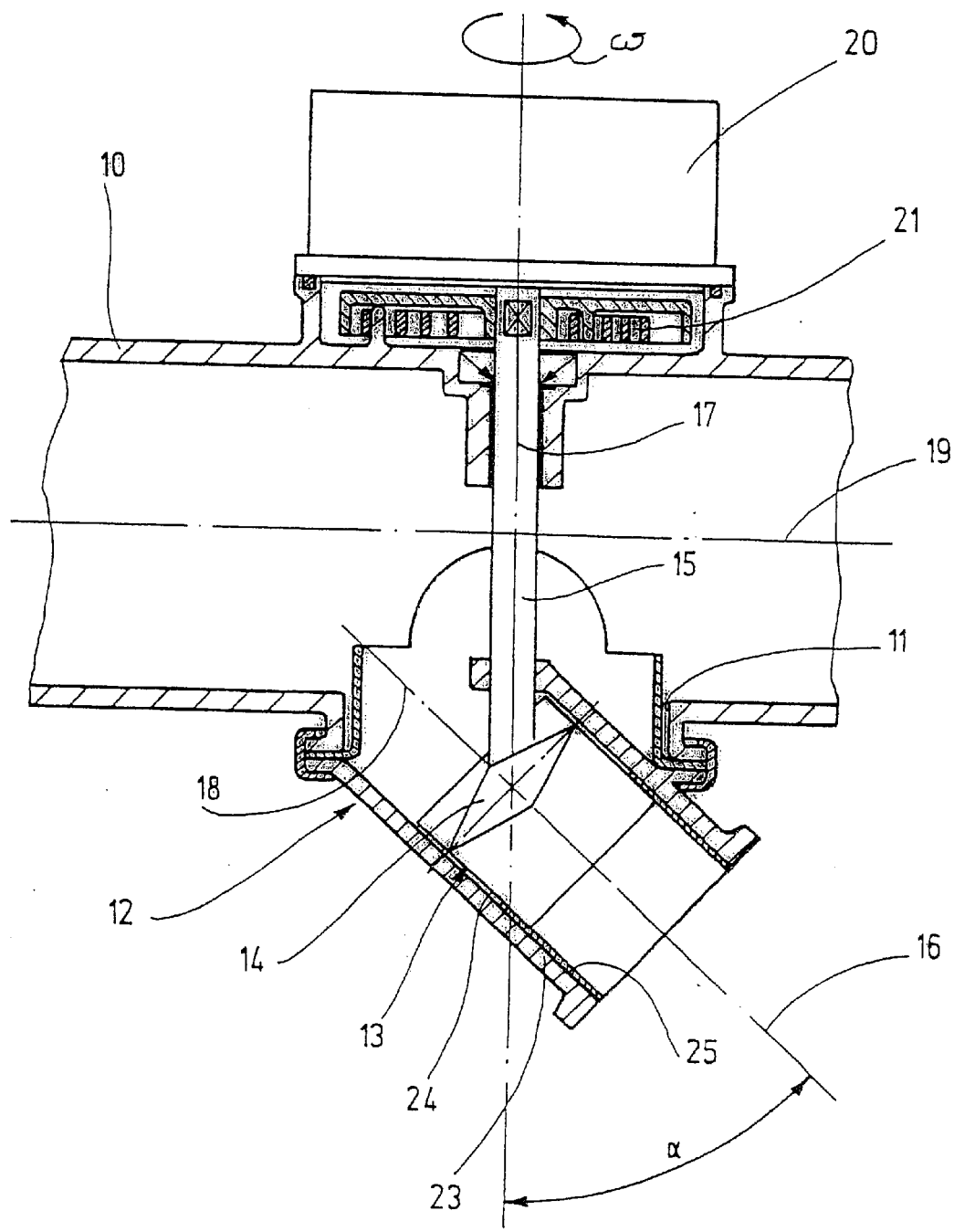
FIG. 2, is the same view as in FIG. 1 through a modified flap valve.

In the modified flap valve 12 shown in FIG. 2, the valve tube 13 does not itself embody the tubular stub to be connected to the exhaust gas conduit of the engine, but instead is embodied as an elastically deformable thin-walled a tube 24, which is inserted with radial play into the rigid tubular stub 23 and is secured by one end to the tubular stub 23. To that end, the thin-walled tube 24 is fastened by one tubular end portion in a sleeve 25, which is received by positive and nonpositive engagement in the tubular stub 23. The valve flap 14, fastened to the flap shaft in the same manner as described above, is adapted in shape and surface area to the inside cross section of the thin-walled tube 24. In the exemplary embodiment of FIG. 2, the thin-walled tube 24 has a circular inside cross section, and the diameter of the likewise circular valve flap 14 is dimensioned to be equal to the inside diameter of the thin-walled tube 24. Once again, with regard to the flap shaft 15, the valve flap 14 is oriented such that in the closing position of the valve flap 14, its surface normal 16 is aligned with the axis 18 of the thin-walled tube 24. Because of the elasticity, in the closing position of the valve flap 14 (shown in FIG. 2), the thin-walled tube 24 conforms to the edge of the circular valve flap 14 and assures adequately great tightness of the flap valve 12 in the closing position of the valve flap 14, without requiring an additional sealing element 22 as in the case of the flap valve 12 of FIG. 1. The remaining structure of the flap valve 12 of FIG. 2 and its mode of operation are both identical to what has been described for FIG. 1, and thus identical components are identified by the same reference numerals.

In FIGS. 3 and 4, the flap valve 12 is shown as a detail with a modified valve flap 14, once in longitudinal section (FIG. 3) and once in a view taken along the axis 18 of the valve tube 13 (FIG. 4), in each case in three different pivoted positions of the valve flap 14. The valve flap 14, again embodied as circular, is modified in the sense that its diameter is selected to be somewhat greater than the inside diameter of the thin-walled tube 24. As in the flap valve 12 of FIG. 2, once again the flap shaft, not shown here, is oriented such that its axis forms the acute angle α=45° with the axis 18 of the thin-walled tube 24. Because of its greater diameter, the valve flap 14 is secured to the flap shaft 15 in such a way that in its closing position, its surface normal 16 extends at an acute angle β to the axis 18 of the thin-walled tube 24. This angle β is larger, the greater the difference in diameter between the diameter of the valve flap 14 and the inside diameter of the thin-walled tube 24. Because of this diameter difference, the thin-walled tube 24 in the closing position of the valve flap 14 deforms into an ellipse, whose long radius is equivalent to the radius of the valve flap 14, and which in its first approximation has the same circumference as the undeformed circle of the thin-walled tube 24. When the flap valve 12 is open, the valve flap 14 always has contact with the thin-walled tube 24 at only two points. In the view shown in FIG. 3a and FIG. 4a, the valve flap 14 assumes its closing position. As indicated by dot-dashed lines, the thin-walled tube 24 is elastically deformed in that case. In the view of FIGS. 3b and 4b, the flap valve 12 is partly open, while in the view in FIGS. 3c and 4c, the flap valve 12 is maximally opened. At an angle α=45° between the axis of the flap shaft and the axis 18 of the thin-walled tube 24, the flap shaft here again traverses the rotational angle ω=180°.

Figure 5:
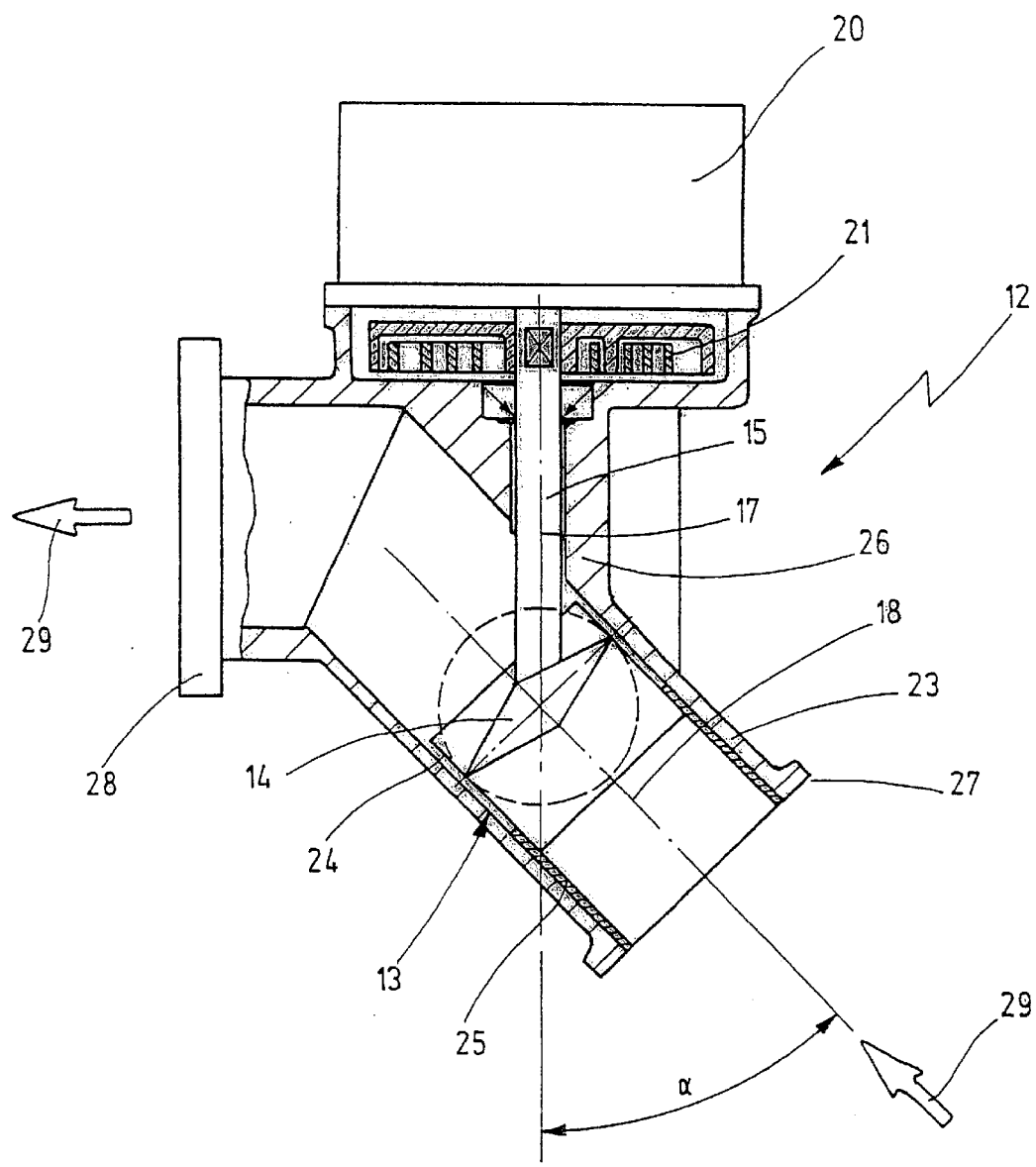
FIGS. 5 and 6, are respectively, a longitudinal section through a flap valve in accordance with further exemplary embodiments.

In FIG. 5, a modified flap valve 12 is shown in longitudinal section. Where it agrees with the flap valve shown in FIG. 2, identical components are provided with the same reference numerals. The flap valve 12 has a valve housing 26, in which the tubular stub 23 that receives the valve tube 13 is integrated in one piece. Once again, the valve tube 13 is embodied as an elastically deformable thin-walled tube 24, which is received in the tubular stub 23. The flap shaft 15 is rotatably supported in the valve housing 26 and is again rotated relative to the axis 18 of the valve tube 13 by the acute angle α (in this case α=45°). Once again with regard to the axis 17 of the flap shaft 15, the valve flap 14 is oriented such that its surface normal 16 is aligned with the valve tube axis 18. The flap shaft 15 protrudes, with its end remote from the valve flap, out of the valve housing 26. This shaft end is engaged by the control motor 20 and the restoring spring 21. For incorporating the flap valve 12 into a gas stream, such as the stream of exhaust gas from an internal combustion engine, the valve housing 26 has two connection flanges 27, 28, each assigned to one tube end of is the valve tube 13, which are embodied in one piece with the tubular stub 23. The axis of the one connection flange 27 is aligned with the valve tube axis 18, and the axis of the other connection flange 28 extends perpendicularly to the flap shaft 15. The mode of operation of this flap valve 12 is the same as described above for FIGS. 1 and 2. The gas stream that passes through the flap valve 12 is represented by arrows 29.

Figure 6:
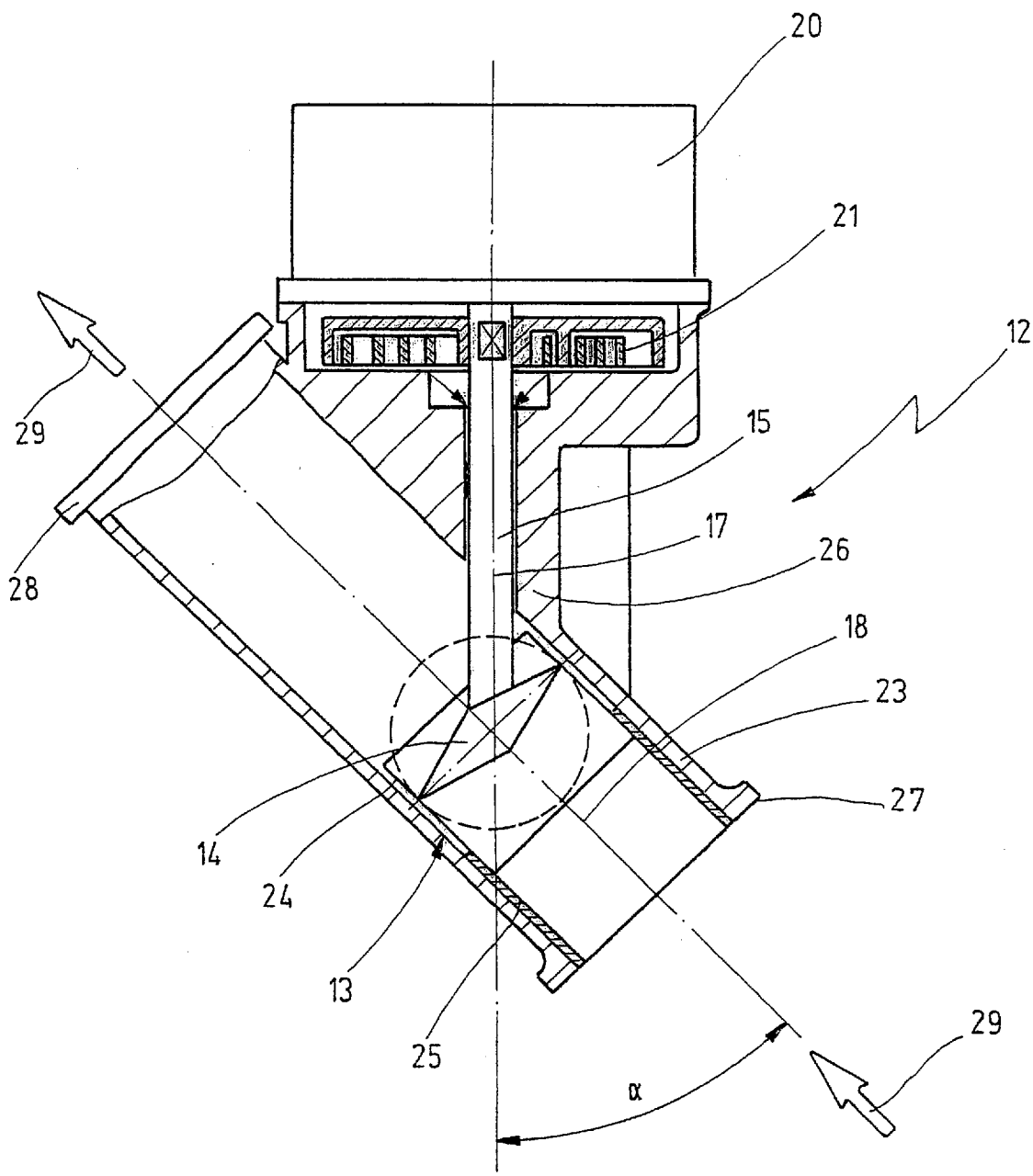

The further flap valve 12 shown in longitudinal section in FIG. 6 differs from the flap valve 12 of FIG. 5 only in that the tubular stub 23 is embodied not with a sharp bend but rectilinearly. Accordingly, the flange axes of the two connection flanges 27, 28 embodied on the valve housing 26 are aligned with one another and with the axis 18 of the valve tube 13.

The two flap valves of FIGS. 5 and 6 are inserted, for instance as exhaust gas recirculation valves, into the exhaust gas recirculation line of an internal combustion engine. In that case, the two connection flanges 27, 28 are mounted on corresponding flanges, embodied on two portions of the exhaust gas recirculation line, and are joined in gastight fashion to these portions.

The foregoing relates to preferred exemplary embodiments of the invention, it being understood that other variants and embodiments thereof are possible within the spirit and scope of the invention, the latter being defined by the appended claims.

We claim:

1. In a flap valve for controlling a gas stream, having a valve tube (13) carrying the gas stream and having a valve flap (14), disposed in the valve tube (13) and pivotable between an open position and a closing position, which valve flap is seated in a manner fixed against relative rotation on an adjustable flap shaft (15) and covers an inside valve tube cross section in the valve tube (13) in the closing position and maximally uncovers it in the open position, the improvement wherein the flap shaft (15) is oriented in such a way that its axis (17) forms an acute angle (α) with the axis (18) of the valve tube (13), and that the valve flap (14) is secured to the flap shaft (15) in such a way that in its closing position, its surface normal (16) extends at an acute angle (β) to the axis (18) of the valve tube (13).

2. The flap valve of claim 1, wherein the angle (α) between the axis (17) of the flap shaft (15) and the axis (18) of the valve tube (13) is equal to or greater than 10° and less than 90°.

3. The flap valve of claim 2, wherein the valve tube (13) is integrated with a valve housing (26) in which the flap shaft (15) is rotatably supported, and that the housing (26) has two connection flanges (27, 28), each assigned to one end of the valve tube.

4. The flap valve of claim 2, wherein the valve tube (13) is inserted in gastight fashion into an opening (11) provided in the jacket of a further tube (10) that guides a gas stream and is oriented such that the flap shaft (15) extends transversely to the axis (19) of the further tube (10).

5. The flap valve of claim 1, wherein the valve tube (13) is integrated with a valve housing (26) in which the flap shaft (15) is rotatably supported, and that the housing (26) has two connection flanges (27, 28), each assigned to one end of the valve tube.

6. The flap valve of claim 5, wherein the flap shaft (15) protrudes by its end remote from the flap out of the housing (26) or out of the further tube (10), and that this end of the shaft is engaged by a control motor (20) and a restoring spring (21) that rotates the flap shaft (15) back into a basic position, and that the basic position of the flap shaft (15) is defined by a stop.

7. The flap valve of claim 6, wherein the basic position of the flap shaft (15) is set such that in the basic position of the flap shaft (15), the valve flap (14) assumes its closing position.

8. The flap valve of claim 5, wherein said flap valve is an exhaust gas recirculation valve in the exhaust gas recirculation line of an internal combustion engine.

9. The flap valve of claim 1, wherein the valve tube (13) is inserted in gastight fashion into an opening (11) provided in the jacket of a further tube (10) that guides a gas stream and is oriented such that the flap shaft (15) extends transversely, preferably perpendicularly, to the axis (19) of the further tube (10).

10. The flap valve of claim 9, wherein the flap shaft (15) is rotatably supported in the wall of the further tube (10) and protrudes with one shaft end through the jacket opening (11) of the further tube (10) into the valve tube (13) and carries the valve flap (14) on this end of the shaft.

11. The flap valve of claim 10, wherein the flap shaft (15) protrudes by its end remote from the flap out of the housing (26) or out of the further tube (10), and that this end of the shaft is engaged by a control motor (20) and a restoring spring (21) that rotates the flap shaft (15) back into a basic position, and that the basic position of the flap shaft (15) is defined by a stop.

12. The flap valve of claim 9, wherein said flap valve is an exhaust gas recirculation valve in the intake tract of an internal combustion engine, and wherein the further tube is formed by an air intake tube (10) leading to the engine, the valve tube (13) being connected to an exhaust gas conduit of the engine.

13. The flap valve of claim 9, wherein the flap shaft (15) protrudes by its end remote from the flap out of the housing (26) or out of the further tube (10), and that this end of the shaft is engaged by a control motor (20) and a restoring spring (21) that rotates the flap shaft (15) back into a basic position, and that the basic position of the flap shaft (15) is defined by a stop.

14. The flap valve of claim 1, wherein a sealing element (22) which is operative between the valve flap (14) and the inner wall of the valve tube (13) in the closing position of the valve flap (14) is disposed on the valve flap (14) such that the sealing element protrudes from the valve flap around the circumference thereof.

15. The flap valve of claim 1, wherein the valve tube (13) is embodied as elastically deformable thin-walled tube (24), and the valve flap (14) is adapted in form and surface area to the inside cross section of the thin-walled tube (24).

16. The flap valve of claim 15, wherein the thin-walled tube (24) has a circular inside cross section, and the diameter of the circular valve flap (14) is dimensioned to be greater than the inside diameter of the thin-walled tube (24).

17. The flap valve of claim 15, wherein the thin-walled tube (24) is received with radial play in a rigid tubular stub (23) and is secured by one end to the tubular stub (23).

18. The flap valve of claim 1, wherein the flap shaft (15) can be motor-driven.

* * * * *